(12) United States Patent
Krishnan (10) Patent No.: US 9,109,715 B2
(45) Date of Patent: Aug. 18, 2015

(54) RESONANT SUPERSONIC GAS VALVE AND NOZZLE

(75) Inventor: Mahadevan Krishnan, Oakland, CA (US)

(73) Assignee: Alameda Applied Sciences Corp., San Leandro, CA (US)

( * ) Notice: Subject to any disclaimer, the term of this patent is extended or adjusted under 35 U.S.C. 154(b) by 850 days.

(21) Appl. No.: 12/245,748

(22) Filed: Oct. 5, 2008

(65) Prior Publication Data

US 2010/0084494 A1  Apr. 8, 2010

(51) Int. Cl.
*F16K 31/02* (2006.01)
*F16K 31/06* (2006.01)
*B05B 1/00* (2006.01)
*B05B 1/14* (2006.01)

(52) U.S. Cl.
CPC .............. *F16K 31/0658* (2013.01); *B05B 1/005* (2013.01); *B05B 1/14* (2013.01)

(58) Field of Classification Search
CPC ..... F16K 31/02; F16K 31/06; F16K 31/0644; F16K 31/0648; F16K 31/1651; F16K 31/0655; F16K 31/0658; B05B 1/005; B05B 1/14

USPC .......... 239/585.3; 251/129.15, 129.16, 129.21
See application file for complete search history.

(56) References Cited

U.S. PATENT DOCUMENTS

| | | | | |
|---|---|---|---|---|
| 5,178,332 | A * | 1/1993 | Tsukakoshi et al. | 239/552 |
| 5,375,811 | A * | 12/1994 | Reinicke | 251/129.16 |
| 6,505,112 | B1 * | 1/2003 | Merminod et al. | 701/103 |
| 8,366,026 | B2 * | 2/2013 | Wang et al. | 239/585.3 |

* cited by examiner

*Primary Examiner* — Christopher Kim
(74) *Attorney, Agent, or Firm* — File-EE-Patents.com; Jay A. Chesavage (57) ABSTRACT

A high speed valve has a conductive flyer plate responsive to eddy currents induced by an adjacent coil. The eddy currents generate a repulsive force which opens the valve, and a low-mass flyer plate and spring combined with a resonant plate and spring combination provide a fast opening and closing time for the valve. A nozzle structure directs a supersonic flow of gas into a rectangular array of high-density gas suitable for interaction with a laser beam transverse to the rectangular array of jets for the production of wakefield interaction, leading to very high-energy electrons from the gas jet.

6 Claims, 4 Drawing Sheets

Figure 1

High Speed Valve assembly

Figure 2

Gas Jet for Wakefield Acceleration

*Figure 6B*
o-ring detail

*Figure 6C*
nozzle detail
(not scale)

*Figure 6D*
nozzle detail
(not scale)

*Figure 6E*
Pressure Distribution
(nozzle only)
P(x)

*Figure 6F*
Pressure Distribution
(nozzle+wire)
P(x)

RESONANT SUPERSONIC GAS VALVE AND NOZZLE

FIELD OF THE INVENTION

The present invention relates to a fast opening and closing gas valve. In particular, it relates to an electromagnetically actuated valve which uses eddy current generation to repel a flyer plate which is electro-magnetically coupled to a coil fed with a pulsatile current, the flyer plate opening and closing very rapidly, thereby rapidly opening and closing a valve seal, with advantages for the injection of a gas or gas mixtures to form supersonic jets of gas into a region such as a vacuum.

BACKGROUND OF THE INVENTION

Electromagnetically controlled solenoidal valves are commonly used to control the passage of gasses and liquids from a pressurized region into a chamber. Because of the large mechanical masses associated with the solenoid plunger related structures, these prior art devices are slow, often on the range of several milliseconds to open or close. Numerous emerging fields require an electrically controlled gas valve with faster response time.

In flash x-ray machines, a supersonic shell or cylinder of gas is compressed by high currents to form a dense, hot plasma pinch, which radiates the desired x-rays in a short pulse.

In laser-wakefield acceleration (LWFA) devices, it is possible to provide electron accelerators with unprecedented electric field gradients. In this application, supersonic and highly collimated gas jets and gas-filled capillary discharge waveguides are two primary targets of choice for LWFA. Present gas jets have lengths of only 2-4 mm at densities of $1\text{-}4\times10^{19}$ $cm^{-3}$, sufficient for self-trapping and electron acceleration to energies up to approximately 150 MeV. While 3 cm capillary structures have been used to accelerate beams up to 1 GeV, when using gas jets, a well collimated beam that is ≥10 mm in length, <500 µm in width and with the ability to tailor the gas density profile to optimize the LWFA process is required.

In other accelerators, it is sometimes desirable to inject a metered pulse of gas into a beam-line or test cell. One difficulty in the prior art is the requirement for precise control of the mass injected so that only the region of interest is filled with gas, while the rest of the accelerator structure can remain at high vacuum. For this application, the gas burst must be fast enough so that a high vacuum event may occur before the injected gas reaches the high vacuum region to perturb it.

To provide an example of the time scales involved, consider a typical supersonic gas velocity of 500 m/s. Gas will propagate a distance of 0.5 m in 1 millisecond. Hence, to ensure that the region beyond 0.5 m is unperturbed by the injected gas, the entire gas burst should be completed in less than 1 millisecond. A high-speed gas valve is desired where the valve opens in approximately 100 microseconds and is fully closed in approximately 500 microseconds.

OBJECTS OF THE INVENTION

A first object of this invention is a high speed gas valve with a first housing opposite a coil housing having an aperture, the aperture sealed with an o-ring and flyer plate, the flyer plate held over the aperture by a spring which is pressing against the housing, the flyer plate coupled to the magnetic field of a coil embedded in the coil housing, the coil generating eddy currents and an opposing magnetic field in the flyer plate sufficient to cause the flyer plate to repel away from the coil housing and an associated seal, the seal coupling the pressurized gas in the housing to a stilling volume of sufficient depth to achieve supersonic velocity of the gas exiting the stilling volume.

A second object of the invention is a nozzle array for directing a supersonic gas which is leaving a stilling volume associated with a pressurized gas valve and directing the supersonic gas into a plurality of cylindrical apertures separated from the laser beam by sufficient distance to create a rectangular array of flow with density sufficient to cause wakefield interactions with a laser beam passing transverse to the flow.

A third object of the invention is a piston valve structure which has a resonant response time associated with a spring constant and the moving mechanical mass of the piston valve, the piston valve powered by the repulsion force of an induced eddy current from a substantially stationary electromagnet, the piston valve opening a seal, thereby coupling a pressurized gas from a replenishment reservoir into a stilling volume, the circular aperture leading to the stilling volume sealed from the replenishment reservoir with a seal pressed against the piston valve, the stilling volume coupled to a plurality of linearly arranged nozzles, the nozzles optionally cooled with a liquid gas such as nitrogen to improve the supersonic flow profile within each nozzle.

SUMMARY OF THE INVENTION

A high-speed valve has a planar flyer plate, which seals against a seal located adjacent to a coil housing with a stilling volume aperture for the supersonic passage of a gas. The flyer plate has a planar surface electromagnetically coupled to a coil, the flyer plate having a high electrical conductivity and minimal mass, and the flyer plate held against the throat plate with a spring. The coil housing includes an o-ring for sealing the flyer plate against the throat plate. A solenoid coil generates a quickly varying magnetic field perpendicular to a planar region of the flyer plate and is positioned to maximally couple the changing magnetic field into the flyer plate, thereby generating eddy currents and repelling the flyer plate way from the coil housing, thereby opening the valve. The return spring and flyer plate mass are selected to provide a mechanical resonance with a sinusoidal half cycle time equal to the desired close time of the valve. In this manner, an electromagnetically driven, fast supersonic gas valve opens in less than 100 µs, closes in approximately 500 µs and can operate at pressures beyond 1000 psia. The valve requires optimization of many parameters: flyer plate mass and strength, electromagnetic driver bank speed and stored energy for high rep-rate (>10 Hz) operation, return spring non-linearity and choice of materials for various components.

DETAILED DESCRIPTION OF THE INVENTION

Figure 1:
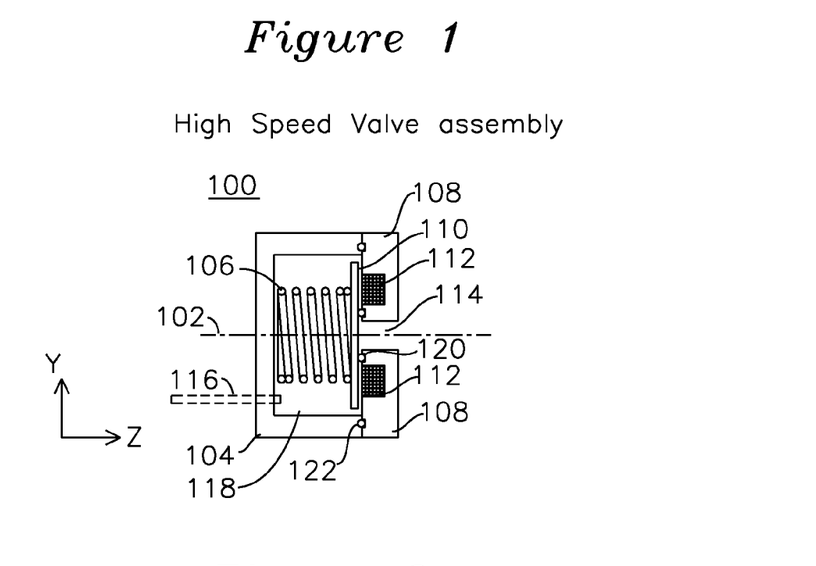
FIG. 1 is a cross section view of a high-speed valve assembly.

FIG. 1 shows one example embodiment of the high-speed valve assembly according to the present invention. Housing 104 and coil housing 108 have an o-ring seal 122, which allows an enclosed volume 118 to be filled, by an inlet port 116, which may be coupled to a source of Helium or any other gas. FIG. 1 is shown as a cross section through a circularly symmetric valve 100, and structures which appear in a particular location such as inlet 116 shown as a dashed line. The housing 104 also provides support for a spring 106 which presses a flyer plate 110 against an o-ring 120 seated in coil housing 108, thereby sealing the enclosed pressurized volume 118 from stilling volume 114. O-ring 122 seals the pressurized volume 118 between the housing 104 and coil housing 108. An electromagnetic coil 112 carries a pulsatile current of sufficient magnitude to induce an azimuthal eddy current in electrically conductive flyer plate 110. Coil housing 108 is fabricated from a material less electrically conductive than flyer plate 110, or coil housing 108 has radial slots or other structures which discourage the formation of eddy currents in coil housing 108 which would reduce those formed in flyer plate 110. Similarly, structure 104 can be fabricated using materials and structures such as slots and the like, which minimize eddy current formation in structure other than flyer plate 110. The eddy currents generated in flyer plate 110 generate a magnetic field which opposes the rapidly building magnetic field generated by coil 112, thereby forcing the flyer plate 110 away from the coil 112, and opening the o-ring 120 seal, allowing gas from the volume 118 to enter and propagate through stilling volume 114. Spring 116 is selected to generate a sufficiently high closing force to rapidly close the valve after decay of the eddy current and coil repulsion force, and the mass of the spring and flyer plate 110 are selected to be as low as possible to allow the spring 106 and flyer plate 110 combination to operate as a resonant mechanical system over half a sinusoidal displacement, such that the flyer plate 110 axial displacement over time generally follows a time-scaled sine(t) curve from t=0 to t=pi. Other displacement functions are possible, but this is believed to be the best mode of the invention.

The stilling volume 114 on the opposite side of the flyer plate is selected to have a length along the axis 102 and a width perpendicular to the axis according to the propagation properties of helium moving at supersonic speeds, as will be described later. Additionally, a profiling nozzle may be added at the end of the stilling volume 114 to form the gas jet into a desired sectional area for particular purposes, such as to interact with a laser beam for LWFA plasma production.

Figure 2:
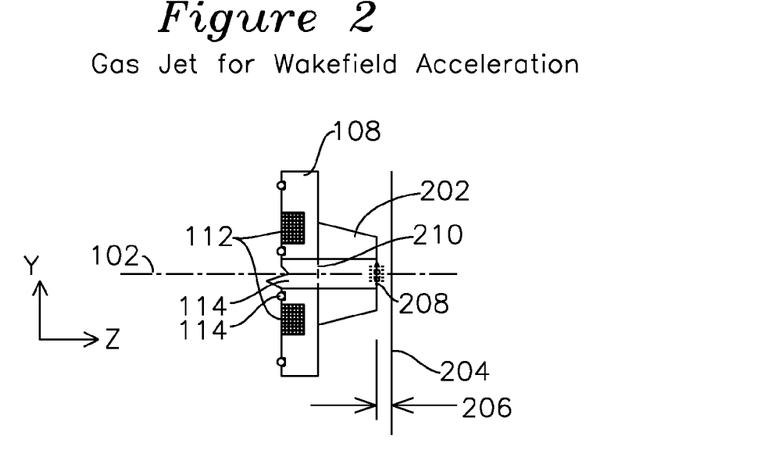
FIG. 2 is a cross section of a nozzle for interaction with a laser beam.

FIG. 2 shows an example embodiment that includes a nozzle 202 coupled to the stilling volume 114 to form a wakefield gas jet for interaction with a laser beam 204. In an example case where the gas jet travels supersonically along axis 102 as shown in FIG. 2 and crosses the path of a laser beam 204 transverse to the axis 102, one objective may be to generate a wakefield acceleration by using gas valve 100 in combination with nozzle 202 having a plurality of 200 micron holes 208 (shown in front FIG. 2A) placed at the end of the stilling volume 114 to form the emitted supersonic gas into a profile of 2 mm along the laser propagation axis (Y axis of FIG. 2B) and <500 μm transverse to the laser axis (X axis of FIG. 2A). The introduced gas density should be in the range of $2\text{-}6 \times 10^{19}$/cc, with a prescribed gradient along both axes if possible, to optimize the laser interaction. The local density specification allows us to estimate the typical operating pressure required in the valve plenum, as follows:

Compressible, isentropic gas dynamic relations give the ratio of local temperature in the flow at Mach number M to the stagnation temperature in the plenum:

$$\frac{T_o}{T} = \left[1 + \frac{\gamma-1}{2}M^2\right] \tag{Eq. 1}$$

Which, using the perfect gas equation of state and the isentropic relation:

$$p = \rho R T \ \& \ \frac{p}{\rho^\gamma} = \text{const.} \tag{Eq. 2}$$

reduces to:

$$\frac{p_o}{p} = \left[1 + \frac{\gamma-1}{2}M^2\right]^{\frac{\gamma}{\gamma-1}} \tag{Eq. 3}$$

$$\frac{\rho_o}{\rho} = \left[1 + \frac{\gamma-1}{2}M^2\right]^{\frac{1}{\gamma-1}} \tag{Eq. 4}$$

For the case where the supersonic flow is to have a mean Mach number of 4, this would give a flow divergence of approximately 15°, provided that the flow has expanded to this Mach number along a well designed, convergent divergent Laval contour. In steady-state flow, it may be shown that the ratio of the area at a given Mach number in the supersonic flow to that at the throat of the nozzle is:

$$\frac{A}{A_*} = \frac{1}{M}\left[\frac{3+M^2}{4}\right]^2 \tag{Eq. 5}$$

For M=4, Eq. 5 gives:

$$\frac{A}{A_*} = 5.64.$$

Figure 2A:
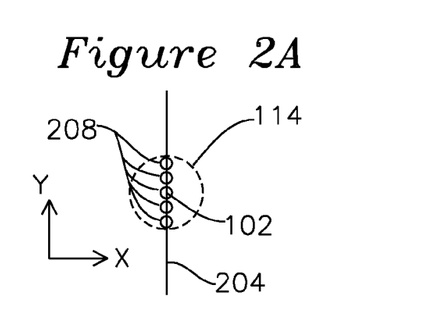
FIG. 2A is a front view of a laser interacting with the gas profile generated by a nozzle.
Figure 2B:
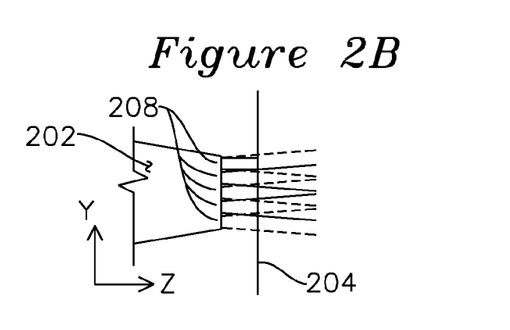
FIG. 2B shows a side view of a laser interacting with a gas profile generated by a nozzle.

If the exit aperture of the nozzle is set to 200 μm, then at a distance of 600 μm from the nozzle exit, the flow will have diverged by roughly 150 μm on both sides of the axis. Thus a 200 μm exit aperture 208 of FIG. 2 will have expanded to a 500 μm width, which is desired. The wakefield laser axis 204 is usually 1 mm or more beyond the nozzle exit (shown as distance 206 of FIG. 2), to minimize damage to the nozzle face. A more detailed Navier-Stokes calculation can be performed to characterize the nozzle exit flow, in order to better determine the actual divergence and hence set the proper distance for the laser axis. The rule of thumb used above, namely that the flow diverges as:

$$\theta = \sin^{-1}\left[\frac{1}{M}\right] \quad \text{(Eq. 6)}$$

is approximate. In one example embodiment, the nozzle exit aperture is 200 μm, which, from Eq. 5 gives a throat diameter of 84 μm. Using this unit-module nozzle, the design provides for a 2 mm dimension along the laser axis via a linear array of 7 or 8 such nozzles. One example embodiment of the nozzles is shown in FIGS. 2A and 2B.

Eq. 1 shows that the temperature at the nozzle exit, in the core flow will be approximately 50 deg K. The local pressure in the flow is therefore approximately 0.25 Bar (3.7 psia). Eq. 3 shows that the plenum pressure must therefore be approximately 26 Bar (380 psia). To provide some safety margin, one embodiment of the design provides for operation at up to 1000 psia. As one example of the need for such a margin, consider the 'stilling volume' 114 shown in FIG. 2 between the valve seat and the throat plate 210. Typically this would be a 2 mm dia by 10 mm long tube, which is initially under vacuum. When the flyer plate 110 moves away from the o-ring seal 120, high pressure gas will rush in to fill this volume. After a 'stilling time', the flow will choke (M=1) at the throats in the throat plate and the flow in the stilling volume will become subsonic. The stilling time may be estimated as a multiple of the round-trip time for sound waves to go back and forth between the throat plate 210 and the valve seat at the flyer plate 110. At a typical sound speed of approximately $10^3$ m/s, the round-trip time to cover 2 cm is 20 μs. Thus it would take about 60-80 μs for the stilling volume to reach equilibrium with the plenum. Since the stilling volume is negligible compared with the plenum volume, there will not be more than a few percent drop in stagnation pressure. Nevertheless, it is prudent to design for some margin.

Considering the flyer plate 110 and spring 106 design, the coil 112 must generate enough force on the flyer plate to accelerate it away from the o-ring seal and develop a quasi-steady supersonic flow in <100 μs. Consider that three forces act on the flyer plate:

$F_m$, the magnetic repulsion due to eddy currents in the metal valve plate,

Fs, the spring return force,

Fg, the gas pressure.

For the case where the feed tube (see FIG. 2A, 2B) is 2 mm in diameter, the o-ring 120 has a 2.5 mm mean radius and is 3 mm in diameter. The gas force at 1000 psia is approximately 135N. Next consider a spring whose (linear) spring constant is 250N/m. With a compression of 1 mm (adequate to allow gas to choke the throats), the maximum return force is 250N, of the same order as the gas force. Thus the two return forces add up to approximately 400N. The EM force from the coil should be much larger than these forces to accelerate the flyer plate. Given that the 'stilling time' was estimated above as approximately 60-80 μs, it is acceptable if the flyer plate moves 1 mm in 100 μs, which corresponds to a mean velocity of 10 m/s.

Next, the mass of the flyer plate 110 is estimated by examining the skin depth of a flyer plate material such as aluminum (Al). It is assumed that the coil current pulse should have a half-period faster than 100 μs, to make maximum use of the EM force in the allotted time. Assuming a rise-time of 50 μs, the skin depth of Al is on the order of 1.2 mm. Hence, the flyer plate 110 flange adjacent to the coil 112 must be thicker than 1.2 mm, to avoid diffusion of the driving magnetic field through the flyer plate 110 flange. With reference to FIG. 1, in one embodiment of the invention, the inner diameter of the toroidal coil 112 is approximately 12 mm and the outer diameter approximately 22 mm for a compact design. Hence the flyer plate mass in the embodiment of FIG. 2 is that of a disk having a flange part about 22 mm in diameter and 3 mm thick, per the above arguments, which is approximately 3 g. To this must be added that fraction of the mass of the spring which is also accelerated. The spring mass is approximately 10 g of which about 20% is compressed, so the total accelerated mass is roughly 5 g. This mass and the velocity give the impulse needed from the coil, as:

$$I_{coil} = 5 \times 10^{-3} \text{ kg} * 10 \text{ m/s} = 0.05 \text{ Ns} \quad \text{(Eq. 8)}$$

For a 50 μs action interval, the force from the coil is 1000N, which is, as expected, much greater than the restoring forces due to the spring and gas.

The next estimate is the oscillation period of the flyer plate when it acts as a simple harmonic oscillator that has been excited by a short impulse. The spring constant is 250N/mm, which, with the accelerated mass of 5 g, gives a harmonic period of 890 us. The half period of 445 μs implies that the flyer plate and spring will move back approximately 1-2 mm then return to the valve seat in about 450 μs. The motion is thereby bounded as opening in 100 μs and closing in approximately 500 μs. To close more rapidly, a stiffer spring or a lower flyer plate/spring mass is used. These constraints to the design are applied in the electromagnetic portion of the design that follows.

The coil 112 and electrical driver (not shown) design may be derived as the energy requirement in the magnetic field generated by the coil is proportional to 0.5 L $I^2$, so the magnetic force is the spatial derivative of this or:

$$F_m = 0.5 * I^2 * dL/dx \quad \text{(Eq. 9)}$$

For a flat spiral coil with an air core and a metal flyer plate in contact with it and metal behind it (see FIG. 1), it may be shown that the inductance varies with distance x away from the coil face as:

$$L(x) = L_o - A e^{(-x/x^*)} \quad \text{(Eq. 10)}$$

where x* is a characteristic scale length for the exponential variation. The scale factors A and x* may be determined empirically by moving the flyer plate away from the spiral coil and measuring the variation of inductance. Eq. 10 gives:

$$\frac{dL(x)}{dx} = \frac{A}{x^*}\{e^{(-x/x^*)}\} \quad \text{(Eq. 11)}$$

whose (maximum) value (at x=0) is:

$$\frac{dL(0)}{dx} = \frac{A}{x^*} \quad \text{(Eq. 12)}$$

Eqs. 9 and 12 show that:

$$F_m = 0.5 * I^2 * \frac{L_o}{x^*}\{e^{(x_o/x^*)}\} \quad \text{(Eq. 13)}$$

To maximize the EM force, it is desirable to use a large coil inductance (A~$L_o$) with minimal scale length x*. In one embodiment, the coil geometry would comprise a planar pancake (disk) coil with minimal wire gauge to maximize the free-space inductance, $L_o$. However, the dissipative resistance of the coil increases as wire gauge decreases, so there is a trade-off: large $L_o$ means lower peak current required but higher resistance in coil (smaller wire gauge) which leads to greater dissipation. The best mode wire gauge of the coil 112 was determined experimentally as follows:

For wire gauges from 24-28 AWG, coils were wound to fit the 22 mm OD/12 mm ID design constraint. Each coil was potted in epoxy, placed in a jig with the Al flyer plate pressed against it and the inductance measured as a function of the distance of the flyer plate away from it. The fitting parameters A and x* (Eq.10) were obtained from these data. The dependence of each of the quantities $L_o$, A and x* on AWG were found to be fit by second order polynomials.

Using these polynomial fits, the values of inductance at x=0, L(0) and hence the maximum EM force (Eq. 12) were calculated for coils ranging from 21 AWG to 30 AWG. The measured values of Lo and calculated values of EM force coefficient (H/m) are listed in the first two columns of Table 1 below after the AWG values.

TABLE 1

Parameters for design of EM coil drive circuit:

| Cu wire AWG | Lo (uH) | EM force H/m | Ipeak (kA) | L(0) (uH) | C (uF) | Vo (V) | Eo (J) |
|---|---|---|---|---|---|---|---|
| 21 | 1.5 | 2.8E−4 | 3.748 | 0.70 | 518 | 373 | 36.1 |
| 22 | 2.1 | 3.2E−4 | 3.558 | 1.16 | 263 | 484 | 30.7 |
| 23 | 2.8 | 3.8E−4 | 3.236 | 1.70 | 157 | 595 | 27.8 |
| 24 | 3.7 | 4.8E−4 | 2.879 | 2.31 | 107 | 698 | 25.9 |
| 25 | 4.8 | 6.2E−4 | 2.543 | 2.99 | 82 | 785 | 25.2 |
| 26 | 6.0 | 7.9E−4 | 2.250 | 3.75 | 66 | 873 | 25.0 |
| 27 | 7.4 | 1.0E−3 | 2.002 | 4.57 | 55 | 965 | 25.8 |
| 28 | 9.0 | 1.2E−3 | 1.795 | 5.47 | 50 | 1059 | 28.2 |
| 29 | 10.7 | 1.5E−3 | 1.620 | 6.44 | 45 | 1184 | 31.8 |
| 30 | 12.6 | 1.8E−3 | 1.473 | 7.48 | 44 | 1328 | 38.6 |

Since the coil has moved <1 mm when the current pulse is over (approximately 50 μs), the EM force is nearly independent of distance x and depends only on $I^2$. Hence the peak current required for coils wound from 21-30 AWG coils was estimated for an EM force of 2000N, using the peak values of H/m from the table 1 and Eq.9. It should also be noted that flat or rectangular cross section conductors might be used in alternate embodiments of the coil, whose objective is to generate a maximum eddy current-related repulsion force against flyer plate 110.

The next step in the analysis is to estimate the circuit parameters. Typical values of resistance of the coils and the ESR of available capacitors imply that the resultant circuit will have a nearly critically damped drive circuit. Thus, the current rise-time is fixed at 20 μs (in accordance with the earlier choice of a 2 mm thick Al flyer plate (skin depth 0.76 mm) and we then calculate the capacitance of an RLC circuit with L(0), R and rise-time specified. The next columns in Table 1 list these values of L(0) and the capacitance values.

Knowing L(0), C, R and $I_{peak}$, it is possible to calculate the initial charge voltage $V_o$ and stored energy $E_o$ for the bank. These values are listed in the last two columns of Table 1.

Figure 3:
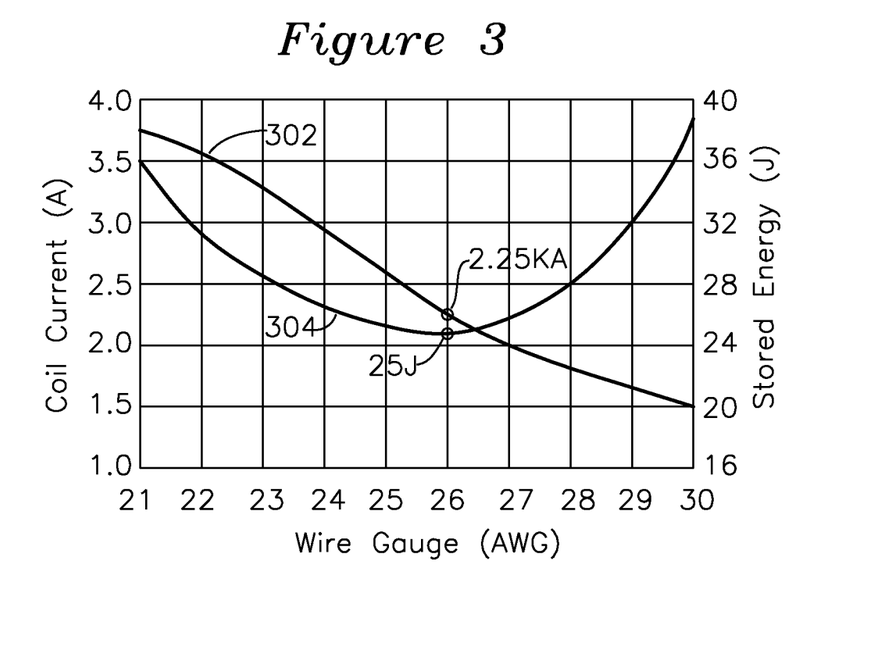
FIG. 3 is a plot of stored energy and coil current versus wire gauge.

FIG. 3 plots the peak current 302 and stored energy 304 vs. wire gauge (AWG). As expected, there is an optimum AWG for the coil which minimizes the stored energy. This AWG is 26, for which the coil requires 2.25 kA peak current and energy of 25 J. Although extensive experiments were performed which produce the 26 AWG wire size result for the particular valve constructed and described herein, the wire gauge is understood to be one of many tradeoff parameters related to the geometry of the valve, placement of the coil, and the like. In one embodiment of the invention, a small number of turns of large diameter wire carry a very large instantaneous current for valve actuation.

Figure 4:
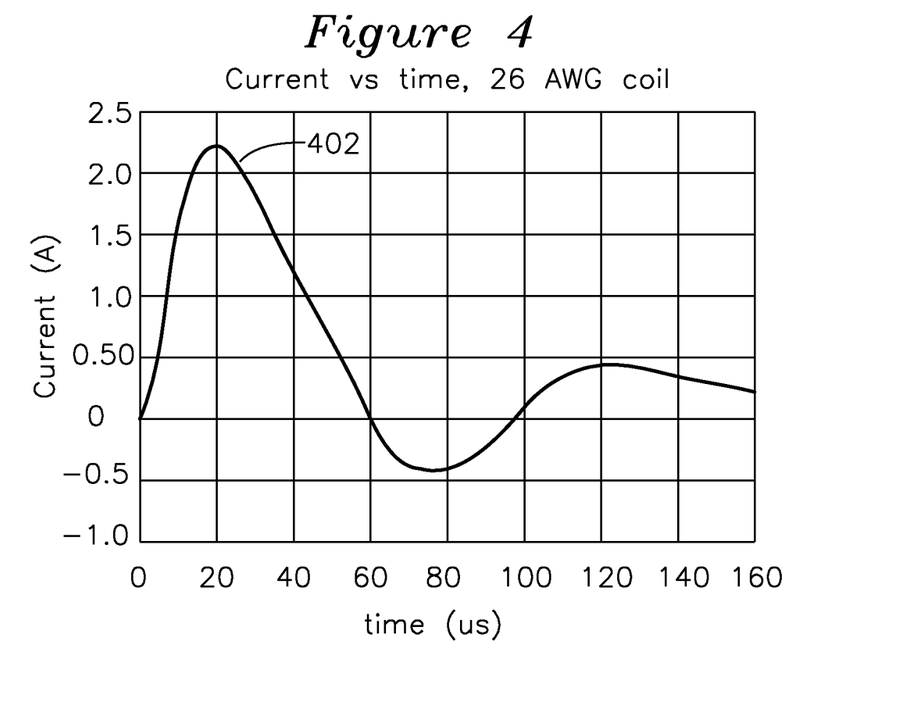
FIG. 4 is a plot of current versus time.

FIG. 4 plots the current for the selected coil, to confirm, a posterior, that the rise-time is 20 μs as assumed and that the impulse is over within 50 μs as assumed. Note that the small secondary impulse due to the negative peak in current will be eliminated by use of an SCR to switch the circuit.

The preceding analysis illustrates the constraints of the preferred embodiments and the order in which the parameters may be determined. One methodology started with the desired supersonic flow and worked backwards, optimizing the various sub-systems, subject to physical constraints. The example design converged upon a 25 J-stored driver that delivers 2250 A to a 3.75 pH coil that accelerates a mass of 5 g to 20 m/s, to open the flow in ≈100 μs. A spring of ≈250N/mm spring constant closes the valve in <500 μs. These parameters fit the constraints that were specified at the start of this design exercise, so serve as a good starting point for our design. The design methodology is presented not to limit the scope of the present invention to the particular example embodiments presented, but is presented to fully understand the breadth of parameters which may be changed while practicing the invention as described herein.

Figure 6A:
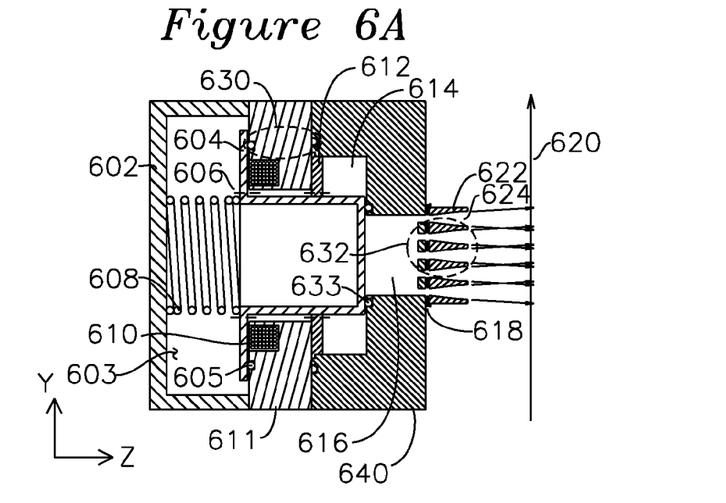
FIG. 6A is a cross section view of another embodiment of a gas valve.

The energy dissipated in the first half cycle of the current in the coil is estimated to be 17 J. At 10 Hz, this valve would dissipate 170 W. By analogy with an air-cooled, 100 W incandescent light bulb, it is evident that thermal management of this power loss is not a big challenge. From equation 1, it can be derived that the temperature in the supersonic flow will greatly reduce to approximately 50° K. as the gas exits the nozzle. This presents a potential problem as heat transfer from the nozzle 293° K. walls to the flow will create a turbulent boundary layer at the walls. The flow in the boundary layer will emerge from the nozzle with a lower Mach number than the core flow, possibly expanding into the path of the laser and spoiling the wakefield interaction. One way to inhibit such boundary layer growth is by cooling the walls surrounding the stilling chamber 616 and nozzle 622 with a liquefied gas such as liquid nitrogen to 77° K. A jacket of $LN_2$ in the nozzle section (not shown) could also serve as a heat sink for the 170 W power dissipated in the coil region.

Figure 5A:
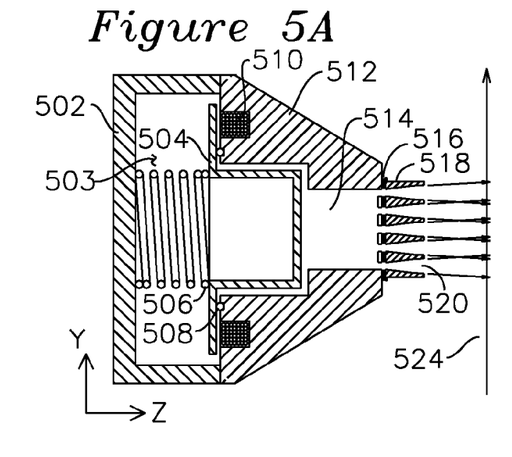
FIG. 5A is a cross section side view of one embodiment of a gas valve.

FIG. 5A shows another embodiment of the invention, where the spring 506 operates between a housing 502 attached to coil housing 512, with the spring 506 pressing piston flyer plate 504 against an o-ring seal 508 which separates the pressurized region 503 fed by a gas source (not shown) from coupling around the piston flyer plate 504 to the stilling region 514. As described earlier, a pulse of current is fed through axial winding 510, which induces eddy currents in the adjacent flange region of the piston flyer plate 504, which generates a force towards housing 502 and compressing spring 506, as described earlier. The open piston valve results in the introduction of pressurized gas past the o-ring seal 508 and into the stilling volume 514, which thereafter flows through a series of shaping apertures in the housing 512, and through matching apertures in high strength sheet 516 to expanding diameter nozzles 520 which are machined into matching nozzle structure 518, also shown in front view FIG. 5B including structures 504 and 512 shown for reference. The nozzle structure 518 shapes the supersonic gas flow after passing through the apertures of the cylindrical stilling volume 514, through molybdenum or titanium membrane 516 which provides a wear-resistant aperture for supersonic gas flow, through nozzle 518 for controlled expansion of the supersonic gas, such that the gas profile is optimum for interaction with the laser beam 524.

FIG. 6A shows another embodiment of the invention which provides a shorter response time for the introduction of gas into the stilling volume than the structure of FIG. 5A or FIG. 1. A reservoir 614 is coupled to the main chamber 603 through a series of slots or holes 606 through the flyer plate flange 604, and also a series of holes through Teflon guide bushing 612. The gas volume of reservoir 614 is sufficient to provide less than a 10% instantaneous pressure drop over the interval of operation for the piston flyer plate 604. As before, coil 610 generates eddy currents in the proximal flange part of piston flyer plate 604, which causes the flyer plate 604 to retract from the damper o-ring 605, whose purpose is not to seal the pressurized volume as was shown in FIG. 5A. O-ring 633 performs sealing of the pressurized volume, such that the withdrawal of flyer plate 604 couples the pressurized, local reservoir 614 to stilling volume 616. The function of the titanium (or other high strength material) plate 618 for reducing wear from the supersonic gas jets, and nozzle 622 for forming jets, is as was described for FIG. 5B. For clarity in viewing the other structures, gas introduction ports and optionally evacuation ports to main reservoirs 503 of FIG. 5A and FIG. 6A are not shown, but these functions may be performed as was shown in FIG. 1 inlet port 116. The coil housing 512 of FIG. 5A and 611 of FIG. 6A are not electrically conductive, or alternatively have a poor electrical conductivity compared to flyer plate 604, to avoid energy loss through eddy currents in structures which do not accelerate flyer plate 504 and 604 of FIGS. 5A and 6A, respectively.

Figure 6B:
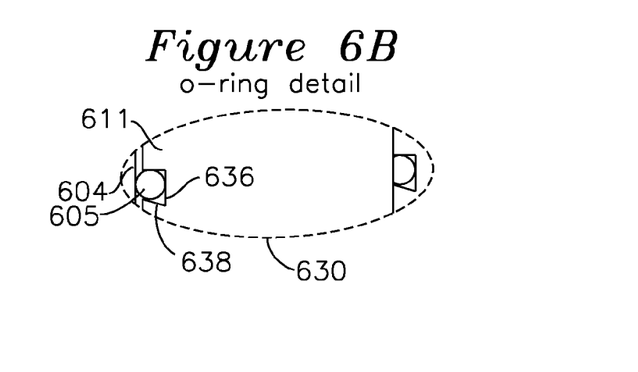
FIG. 6B shows a detail cross sectional view of an o-ring seal.
Figure 6C:
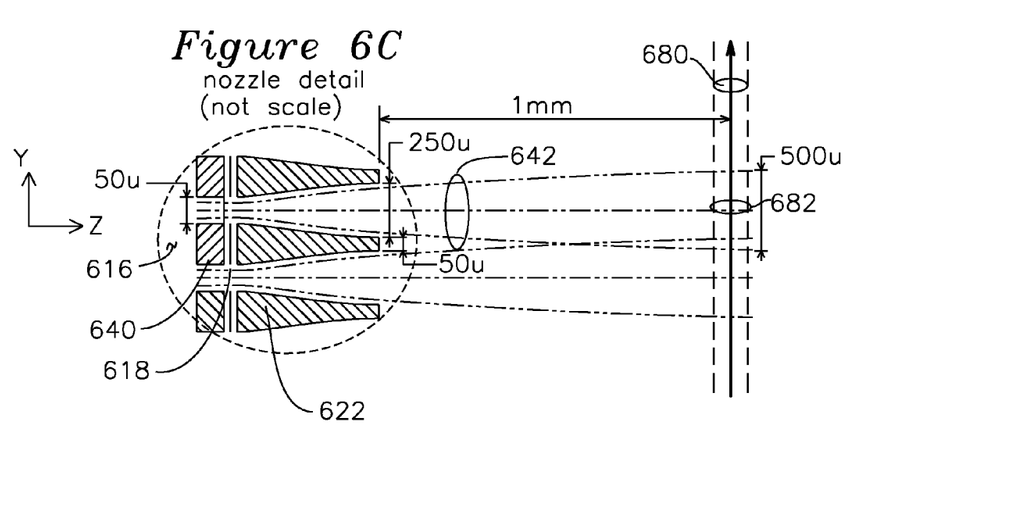
FIG. 6C shows a detail cross sectional view of a nozzle in the YZ plane.

FIG. 6B shows a detailed view of the beveled o-ring 636 seal seat from the region 630 of FIG. 6A. The beveled o-ring seal is formed by a deep o-ring channel, in combination with a beveled inner diameter surface 638, to improve the capturing of the o-rings, which may be subjected to ongoing valve opening and closings. The small sealing diameter of o-ring 633, combined with the large surface area of damping o-ring 605 provides enhanced reliability against o-ring failure. This is done by spreading the impact of valve closing over two o-rings, the larger o-ring 605 not performing the valve seal operation. FIG. 6C shows additional detail for a single nozzle opening from the region 624 of FIG. 6A, where the stilling volume 616 is coupled through apertures in housing 640, titanium wear plate 618, and nozzle 622. An array of such apertures and nozzle openings provides a profiled supersonic gas jet, as was described previously.

Figure 5B:
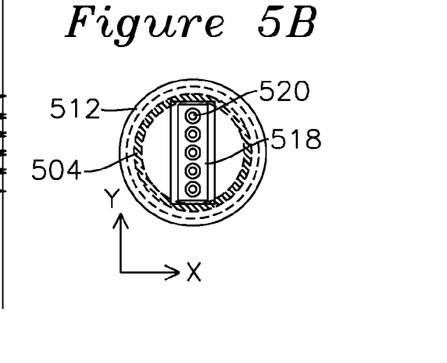
FIG. 5B is a front view of the gas valve of FIG. 5A.

With regard to nozzle design embodiments of the invention, there are many MEMS fabrication techniques, such as Deep Reactive Ion Etching (DRIE) in Si chips and nanofabrication of metals that may be used to create the linear array of nozzles 518 shown in FIGS. 5A and 5B. The nozzle structure 518 of FIG. 5A and 5B and 622 of FIG. 6A as shown in detail FIG. 6C show one embodiment for a jet nozzle that has a lower density in the core of the flow relative to that in the halo around it. By designing the "stub" of the nozzle appropriately and making the throat an annulus as shown, it is possible to tailor the density profile across the jet. By making a fine array of holes in the base plate to feed the annular throat, it is possible to machine the nozzles as a single MEMS unit.

Figure 6D:
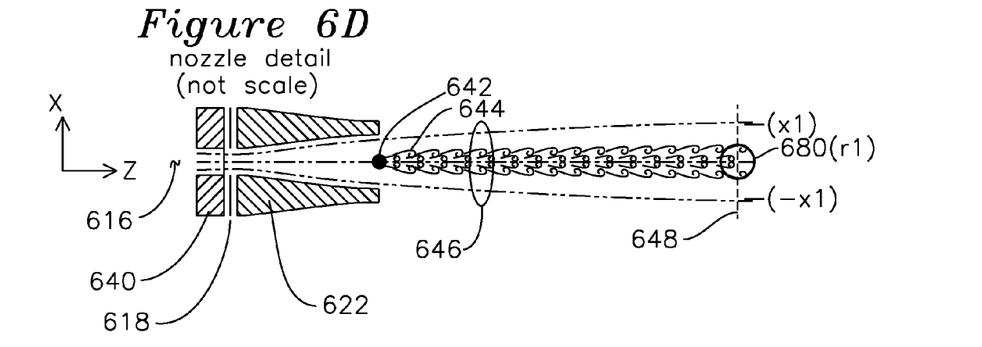
FIG. 6D shows a detail cross sectional view of a nozzle with a turbulence generating structure in the XZ plane.
Figure 6E:
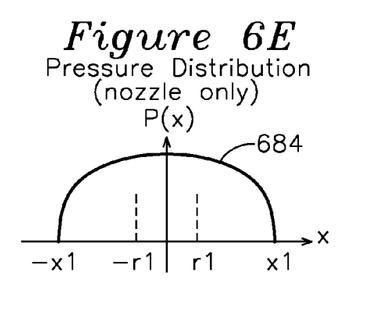
FIG. 6E shows a pressure distribution plot across the X axis at the plane of intersection with a laser beam.

FIG. 6E shows the pressure distribution plot 684 in the x axis (transverse to the section of FIG. 6C) across the laser beam full width half max (FWHM) waist, indicated as r1. The pressure profile generally has a maximum profile at the center of the beam (x=0) in the xz plane. Additionally, since the gas profile is generated by a plurality of individual nozzles, the gas pressure along the propagation Y axis of the laser beam may include pressure variations from the superposition and interaction of the linear array of gas jets, thereby producing a non-uniform gas pressure along Y. In some uses of the invention, it may be desired to reduce the effect of the pressure variations of gas along the Y axis to reduce beam expansion over a long laser beam propagation distance.

Figure 6F:
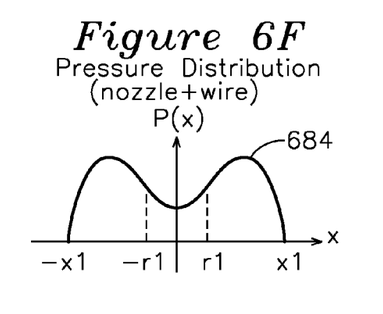
FIG. 6F shows a pressure distribution plot across the X axis at the plane of intersection with a laser beam in the presence of turbulent gas flow.

In one aspect of the invention where it is desired to reduce the gas pressure in the region of the laser beam, provide an increased gas pressure outside the extent of the laser beam, and preserve the vacuum which exists outside the extent of the gas jets, a wire is placed co-axial to the laser beam in front of, or within, the gas nozzles. FIG. 6D shows one embodiment where a wire 642 is placed in the supersonic gas flow region to introduce turbulence at the nozzle 622 outlet, thereby producing a low pressure region in the center of laser beam 680 with FWHM radius r1. Wire 642 may be titanium or any high strength material, and welded or otherwise attached to the front surface of nozzle array 622, crossing one or more nozzles of the array, preferably in the nozzle exit aperture centerline, as shown in section FIG. 6D. The flow profile (viewed now in the XZ plane) has an extent 646 which includes a Karman vortex street extending to the laser waist 680. The pressure distribution along the X axis 648 is shown in FIG. 6F, where the laser FWHM r1 has reduced local pressure compared to the x extent beyond r1 in the non-turbulent areas of gas flow. The reduced gas pressure in the region of the laser can reduce beam expansion of the laser beam over a long Y distance.

The particular nozzles, dimensions, and configurations shown are examples provided for understanding of the invention, and are not intended to limit the invention to only the examples shown. Many different nozzles may be coupled to the stilling volume, including rectangular arrays, and shorter or longer linear arrays which include one or more rows of apertures. Accordingly, these may be coupled to one or more apertures in the stilling volume, or they may be individually coupled. Many structures may be introduced which provide a profile of gas pressure at the region of laser wakefield interaction, including profiling of the walls of the nozzle, and creation of discontinuities between the throat plate apertures and the nozzles. The dimensions of the present example of the invention are provided as the best mode for the particular application of wakefield laser interaction, but other aperture sizes, distances, and lengths may be provided without limitation to the particular examples used. The piston valve may also be used separately or with a stilling volume, or with only apertures and no nozzle at the output of the stilling volume, and the example use of a titanium or high strength plate between the stilling volume and the nozzles is to provide an example in reducing the erosion effects of the supersonic gas, thereby allowing a wider variety of metals for the gas profile forming structures.

I claim:
1. A resonant valve having:
   an enclosed volume coupled to a pressurized gas inlet and having an outlet surrounded by a seal in contact with a flange part of a movable flyer plate;
   a cylindrical electromagnetic coil carrying a pulsatile current for generating eddy currents in said movable flyer plate flange;
   a spring coupled to an opposite surface of said movable flyer plate from said seal and generating a spring force against said seal;
   said outlet coupled to a stilling volume and to an aperture;

where said movable flyer plate mass, said pulsatile current, and the spring constant of said spring are selected such that said flyer plate flange eddy currents flow in a first direction which generates a repelling magnetic force on said movable flyer plate which overcomes the force of said spring and sufficient to separate said movable flyer plate flange from said seal during a first interval of time sufficient to generate supersonic gas flow from said aperture, where the force of said spring in a subsequent interval closes said flyer plate against said seal.

2. The resonant valve of claim 1 where said aperture is a linear array of apertures.

3. The resonant valve of claim 1 where at least one said aperture is conical along an aperture axis.

4. The resonant valve of claim 1 where said aperture generates supersonic flow during said first interval or during said subsequent interval.

5. The resonant valve of claim 1 where said first interval and said subsequent interval are less than 1 ms.

6. The resonant valve of claim 1 where said flyer plate includes a cylindrical part which is surrounded by part of said output aperture.

* * * * *